(12) United States Patent
Rebmann

(10) Patent No.: US 8,727,880 B2
(45) Date of Patent: May 20, 2014

(54) DISTANCE, ORIENTATION AND VELOCITY SENSITIVE CONTROLLER

(75) Inventor: Jochen Rebmann, Backnang (DE)

(73) Assignee: Sony Deutschland GmbH, Berlin (DE)

( * ) Notice: Subject to any disclaimer, the term of this patent is extended or adjusted under 35 U.S.C. 154(b) by 442 days.

(21) Appl. No.: 12/375,235

(22) PCT Filed: Dec. 17, 2007

(86) PCT No.: PCT/EP2007/011084
§ 371 (c)(1),
(2), (4) Date: Feb. 11, 2009

(87) PCT Pub. No.: WO2008/086876
PCT Pub. Date: Jul. 24, 2008

(65) Prior Publication Data
US 2010/0004063 A1  Jan. 7, 2010

(30) Foreign Application Priority Data
Jan. 16, 2007 (EP) .................................... 07100621

(51) Int. Cl.
*A63F 9/24* (2006.01)
(52) U.S. Cl.
USPC .................................. 463/39; 463/36; 463/37

(58) Field of Classification Search
USPC ....................................................... 463/36–39
See application file for complete search history.

(56) References Cited

U.S. PATENT DOCUMENTS

| 3,388,323 | A | | 6/1968 | Stripling |
| 5,421,590 | A | * | 6/1995 | Robbins .......................... 463/37 |
| 6,073,043 | A | * | 6/2000 | Schneider ..................... 600/424 |
| 2006/0116667 | A1 | * | 6/2006 | Hamel et al. ...................... 606/1 |
| 2008/0076567 | A1 | * | 3/2008 | Dohta ............................. 463/37 |
| 2008/0231263 | A1 | | 9/2008 | Rebmann |

FOREIGN PATENT DOCUMENTS

| EP | 1 736 736 | 12/2006 |
| WO | 01 15111 | 1/2001 |
| WO | WO 2004/065896 A1 | 8/2004 |

* cited by examiner

*Primary Examiner* — Yu-Hsi D Sun
(74) *Attorney, Agent, or Firm* — Oblon, Spivak, McClelland, Maier & Neustadt, L.L.P.

(57) ABSTRACT

A mobile magnetic field apparatus operable to generate and/or receive a magnetic field including at least one coil operable to generate and/or receive a magnetic field, respectively, the magnetic field being modulated by at least one frequency and/or identification code, respectively.

27 Claims, 6 Drawing Sheets

DISTANCE, ORIENTATION AND VELOCITY SENSITIVE CONTROLLER

FIELD OF INVENTION

The present invention relates to the field of orientation measurement, in particular to the control and application of the orientation measurement of an object in a magnetic field and in a 3-dimensional space.

PROBLEM

Man-machine interfaces, as used in e.g. controllers for gaming consoles, do normally not provide relative position, orientation or velocity information of e.g. both hands or a hand and a human body to a system. Additionally current developments of relative positioning interfaces (e.g. Nintendo Wii) are using a fixed reference point.

In the field of magnetism a magnetic field is normally generated by a coil due to electromagnetism and said magnetic field induces a voltage in another coil, also called receiver coil, under the premise that the magnetic field strength changes in the receiver coil. It is clear that a non-moving receiver coil is not capable to measure a non-altering magnetic field since no voltage is induced by said magnetic field.

There are already means, which can measure a position and/or orientation of a receiver means in relation to a specific magnetic field generating means. To measure the orientation in a 3-dimensional space normally three orthogonal arranged probes are used to calculate the coordinates. These arrangements are most of the time very bulky and space taking.

Also the construction of the magnetic field generating means and of the magnetic field receiver means, specifically the arrangement of the coils has to be taken into account to evaluate the received information of the received magnetic field and associate the information to a specific orientation of one of the means.

STATE OF THE ART

Currently the latest generation of e.g. gaming controllers can give information of the absolute position of a user in a 3-dimensional room. This is done by the usage of an infrared connection (IR) between a fixed point reference (i.e. positioned at the TV) and the controller in the hand of the user. The controller also has sensors like e.g. a gyroscope which are operable to give acceleration and orientation information.

In another equipment of state of the art, the position of the user or objects can be recognized by the usage of a camera system that is comparing the orientation, acceleration and/or position information with reference positions which are specifically marked.

The calculation of the orientation of a coil within a magnetic field is done normally by the use of coils that are arranged in an orthogonal way. The induced voltage in a coil is depending, among other factors, on the "angle of arrival" of the magnetic field lines. Thales is holding a patent (WO 2004/065896 A1) on "Method and device for magnetic measurement of the position and orientation of a mobile object relative to a fixed structure". This patent covers the usage of three orthogonal coils for distance and orientation measurement.

SUMMARY OF THE INVENTION

The present invention relates to a mobile magnetic field apparatus operable to generate and/or receive a magnetic field comprising at least one coil operable to generate and/or receive a magnetic field, respectively, said magnetic field being modulated by at least one frequency and/or identification code, respectively.

Favourably, the at least one coil is operable to transmit data by modulating the data onto the respective magnetic field and/or receive data via the modulated magnetic field.

Favourably, said mobile magnetic field apparatus is further operable to establish a connection to at least one other mobile magnetic field apparatus and/or to an application system, said application system being operable to process data from said mobile magnetic field apparatus, and to transmit and/or receive data via the serial connection.

Favourably, the connection is a wireless connection and/or a cable connection.

Favourably, said mobile magnetic field apparatus is further operable to generate and/or receive at least a second magnetic field, said at least second magnetic field being distinguishable from the first magnetic field and the other magnetic fields in view of the modulation.

Favourably, said mobile magnetic field apparatus comprises a temperature measuring system operable to measure the temperature, and/or a pressure measuring system operable to measure the pressure, and/or a light sensor operable to measure the characteristics of light, and/or a capacity measuring system operable to measure electric fields, and/or a magnetic field strength measuring system operable to measure the magnetic field strength, and/or a humidity measurement system operable to measure the humidity, and/or a pulse measuring system operable to measure the pulse of a subject, and/or a radio frequency measuring system operable to receive electro-magnetic waves, and/or an acoustic sensor system operable to measure sonic waves, and/or a digital camera system operable to capture visual data, whereby said systems are operable to provide measuring data, respectively.

Favourably, said mobile magnetic field apparatus comprises two or more coils, whereby at least two coils of said two or more coils are orthogonal to each other.

Favourably, said mobile magnetic field apparatus comprises two or more coils, whereby each of said two or more coils has a symmetry axis and the symmetry axis of at least two of said two or more coils are parallel.

Favourably, said mobile magnetic field apparatus operable to generate a magnetic field comprises a signal generator device operable to generate a signal, said signal is modulated by a frequency and/or an identification code, and a transmitter radio frequency processing device operable to receive and process said signal and to output at least one transmitter signal (Ia) to the at least one coil, respectively, whereby said transmitter signals (Ia) are different to each other in view of the modulation.

Favourably, said mobile magnetic field apparatus operable to receive a magnetic field comprises a receiver radio frequency processing device operable to receive and process signals received by at least one coil, respectively, and to output a resulting signal, a digital processing device operable to receive and process the resulting signal and to output a digital signal based on said resulting signal, a numerical stage operable to receive and process the digital signal and to output data comprising relative positions, movements and/or orientations, and an interface operable to receive the data and output said data.

Favourably, said mobile magnetic field apparatus operable to generate and receive a magnetic field comprises a duplexer operable to transmit the signals from the transmitter radio frequency processing device to the at least one coil and to receive the signals from the at least one coil to the receiver radio frequency processing device.

The present invention also relates to a mobile magnetic field controller system operable to measure a relative position, orientation and/or velocity comprising a first mobile magnetic field apparatus according to one of the above-mentioned claims and a second mobile magnetic field apparatus according to one of the above mentioned claims.

Favourably, said first mobile magnetic field apparatus is operable to receive a magnetic field transmitted by said second mobile magnetic field apparatus, and/or vice-versa.

Favourably, said first and/or said second mobile magnetic field apparatus are operable to receive and/or transmit a magnetic field transmitted to and/or received by at least one other mobile magnetic field apparatus, respectively.

Favourably, said mobile magnetic field controller system is further operable to connect to an application system via the interface of the magnetic field apparatus.

Favourably, said mobile magnetic field controller system is operable to connect parallel to the application system, when another magnetic field controller system is connected to the application system.

Favourably, said mobile magnetic field controller system is further operable to connect to at least one other magnetic field controller system via a serial connection, respectively.

DESCRIPTION OF THE DRAWINGS

The features, objects and advantages of the present invention will become more apparent from the detailed description set forth below when taken in conjunction with the drawings, wherein.

DETAILED DESCRIPTION OF THE INVENTION

This invention describes the measurement of the distance, the orientation and the velocity of two or more objects relative to each other by the usage of the magnetic field properties. With these time-relevant data, a controller can be build that enables the human to interact with a machine, e.g. a gaming console, by moving body parts or objects relative to each other.

Figure 1:
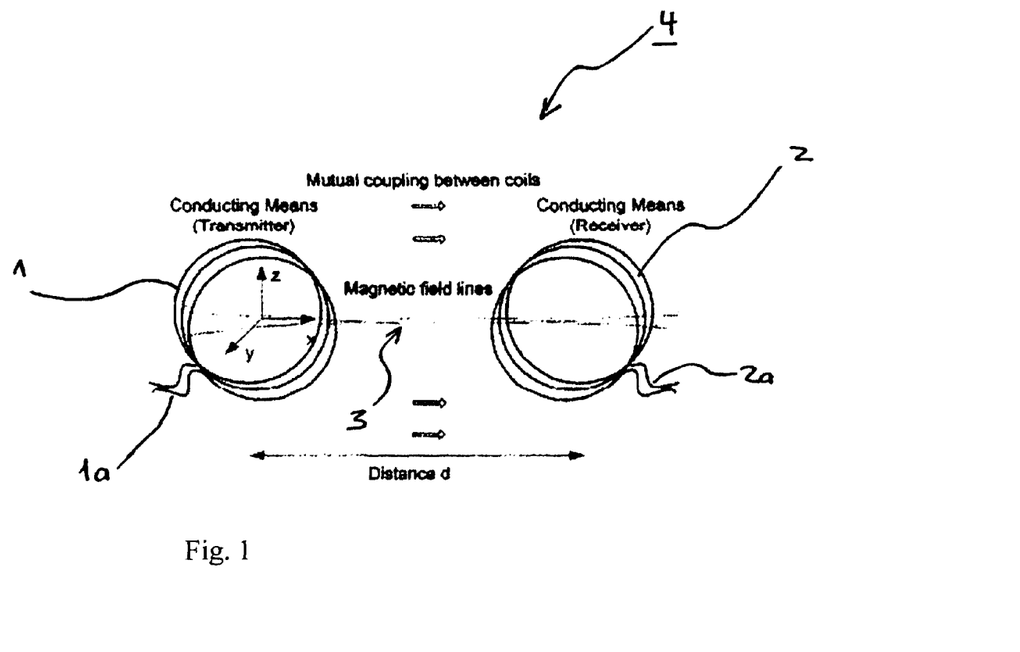
FIG. 1 shows an example of the principle of mutual magnetic coupling between two coils.

FIG. 1 shows a coil arrangement 4 comprising a transmitter coil 1 and a receiver coil 2. This coil arrangement 4 is showing the mutual coupling between said receiver coil 2 and said transmitter coil 1 by a magnetic field 3, said coils having a distance d to each other. The transmitter coil 1 as well as the receiver coil 2 comprises a transmitter feeder 1a and a receiver feeder 2a, respectively. The receiver coil 2 and the transmitter coil 1 comprise a specific number of windings, respectively. It is clear that the increased number of windings, increased amount of current and/or the increased diameter of a coil (as later explained by the formulas) will increase the magnetic field strength regarding the same measuring position. A current is provided to the transmitter coil 1 via said feeder 1a and generates a magnetic field 3 as shown due to the form of the transmitter coil 1. Since the magnetic field 3 is not ideally parallel and decreases in strength with increased distance d to the transmitter coil 1, the change of the magnetic field strength can induce a voltage into the receiver coil 2, when the transmitter coil 1 and/or the receiver coil 2 are moved. In case the current is modulated, thus generating a modulating field, wherein the magnetic field strength is changing over time, the receiver coil 2 can measure the modulating magnetic field without the necessity to move the transmitter coil 1 and/or the receiver coil 2, said field is concurrently generating an induced voltage and eventually a current based on said voltage in the receiver coil 2.

In the description of the present invention the wording "generating" corresponds to the wording "transmitting" to describe the basic operation of the coils operable to generate a magnetic field, whereby said coils are part of a transmitter device in a transceiver setup. Moreover information can be modulated onto the magnetic field, thus turning the coil to a transmitter.

Also the wording "magnetic field device" can be applied to the wording "generator device" or "receiver device" or any other wording comprising a device operable to generate and/or receive a magnetic field.

Figure 2:
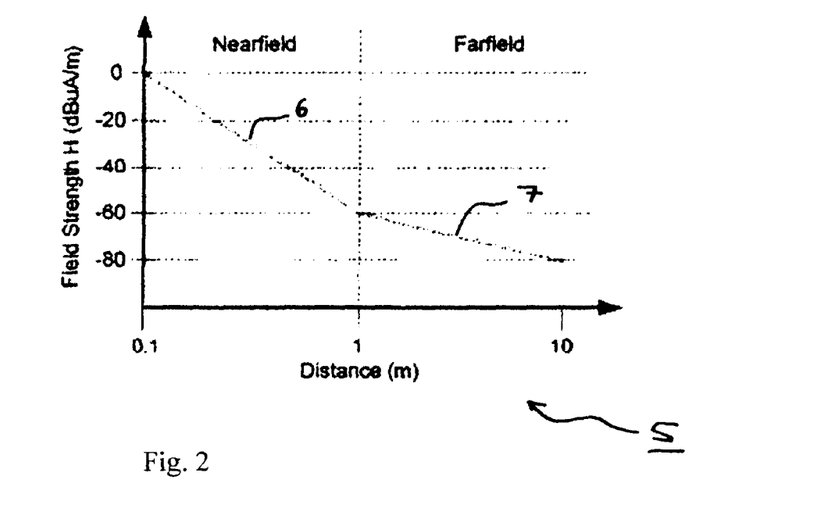
FIG. 2 shows an example of a diagram of the magnetic field strength versus the distance.

FIG. 2 shows a diagram 5, wherein the field strength versus the distance is recorded based on the coil arrangement 4 of FIG. 1. The x-axis is recorded and shown in common logarithm. In detail, in the distance range of 0.1 meter to 1 meter, also called nearfield 6, the field strength drops with 60 dB (decibel) per decade of distance, while in the distance range of 1 meter to 10 meter, also called farfield 7, the field strength drops with 20 dB per decade of distance. This means that the strength of the magnetic field and its change with distance can be measured more easily in the nearfield 6 than in the farfield 7, since the dependency between field strength and the distance is stronger. Also this diagram 5 is idealised by linear approximation to better show the dependency between the field strength and the distance. The nearfield 6 drops linear from 0 dB at 0.1 meter to −60 dB at 1 meter and the farfield 7 drops linear from −60 dB at 1 meter to −80 dB at 10 meter. This diagram is not only dependent on the distance between the coil and the measurement position, but also on the radius of the coil in relation to the distance as described in the later explained formulas.

Figure 3:
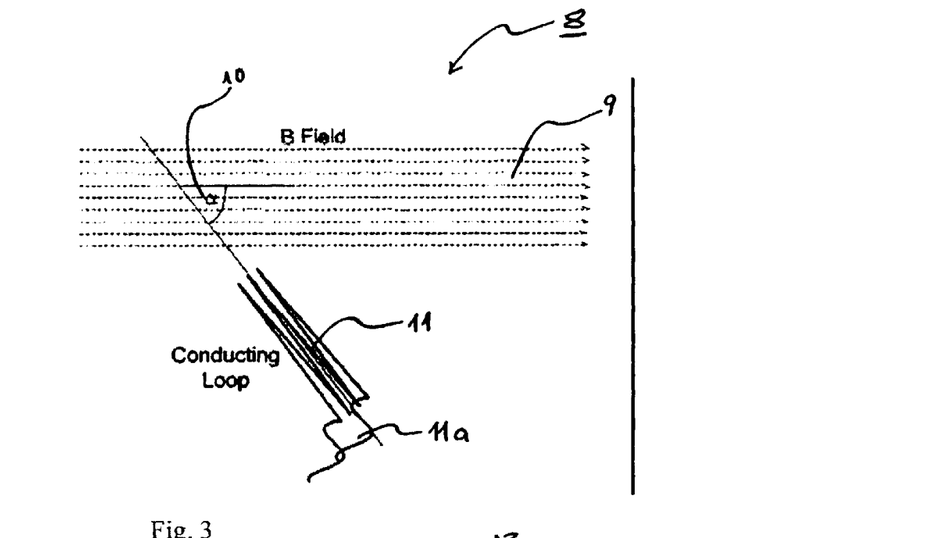
FIG. 3 shows an example of an arrangement of a coil in a parallel magnetic field.

FIG. 3 shows a coil in a parallel magnetic field—arrangement 8. The magnetic field 9 is parallel and is arranged to the surface area of the conducting loop 11 in a specific angle α 10. The conducting loop 11 or also called coil comprises a coil feeder 11a. When the loop 11 is introduced into and/or exposed to the magnetic field 9, only a specific component of the magnetic field based on the angle 10 is effective inside the loop 11 and contributes to the induction of an electric voltage in the circular formed loop 11. At angle α=90°, when the surface area is perpendicular to the magnetic field 9, the induced voltage is at maximum, while at angle α=90°, when the surface area is parallel to the magnetic field 9, the induced voltage is zero. The loop 11 can also be formed in another form like e.g. quadratic and might comprise a specific number of windings. Said current generates a magnetic field, wherein the part of the generated magnetic field, which is inside the loop 11, is directed against the magnetic field 9.

Figure 4:
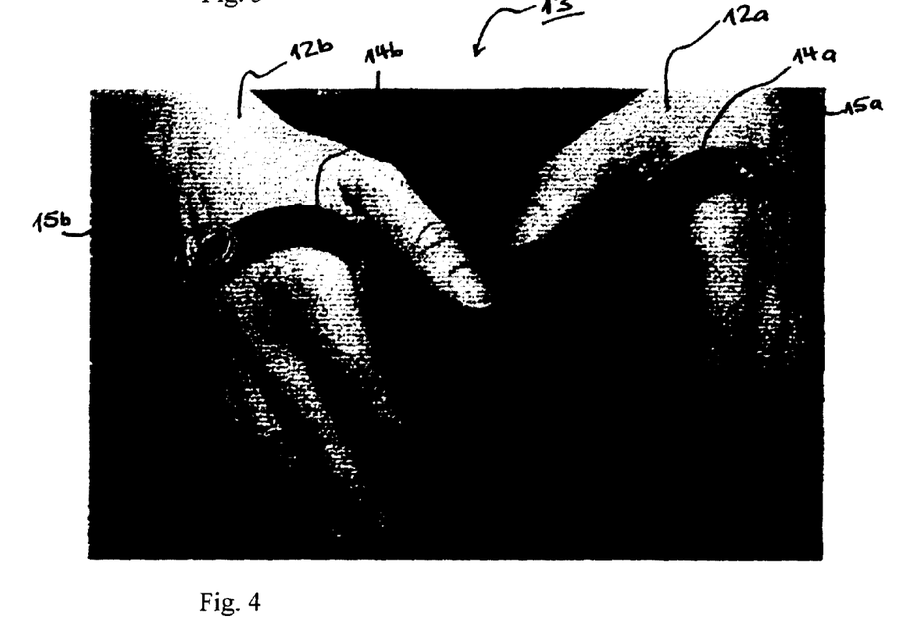
FIG. 4 shows an example of a man-machine interface attached to the hands of a subject.

FIG. 4 shows an example of a test-assembly of a man-machine interface. The parts of the assembly are attached to the left hand 12a and the right hand 12b, respectively. The test assembly comprises on the left hand 12a a fastening band 14a and at least one receiving coil 15a; and additionally said assembly comprises on the right hand 12b also a fastening band 14b and at least one transmitter coil 15b. For the detection of three-dimensional movement at least three coils have to be placed at each hand, respectively. Favourably, these three coils are arranged in an orthogonal way, but can also be arranged e.g. on the same even plane with the symmetry axes parallel to each other. The left and the right fasting bands 14a and 14b are wrapped around the heel of the respective hand. In another embodiment the fasting bands can be wrapped around the wrist and/or the ankle joint. It is also possible to have e.g. gloves wherein or whereon said test assembly is part of only requiring the magnetic field receiver and/or transmitter coils 15a, 15b. Next to said coils other sensors can be implemented to the assembly as later described and shown in FIG. 10.

Figure 5:
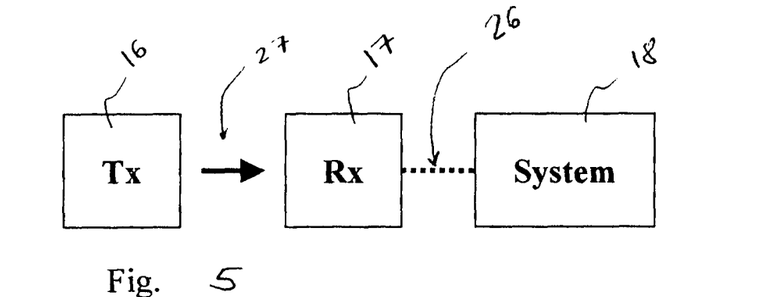
FIG. 5 shows an example of a diagram comprising a first setup of a man-machine interface.

FIG. 5 shows an example of a diagram of a man-machine interface comprising a transmitter device 16 and a receiver device 17. The receiver device 17 is connected to the system 18 by a connection link 26. The transmitter device 16 is operable to generate a magnetic field 27 which is received by the receiver device 17, where the receiver device interprets the magnetic field signals and sends a corresponding signal via the link 26 to the application system 18. The arrow in FIG. 5 indicating the magnetic field 27 shows the origin and the destine of the magnetic field and/or the direction of information or data send from the transmitter device 16 to the receiver device 17 and eventually visualises an unidirectional connection between said devices. Therefore when data apart from the field strength measurement is sent, the signal redundancy has to be high enough to ensure relative flawless data communication, since the errors cannot be reported back to the transmitter device 16. Favourably the link 26 is bidirectional, so that transmitting errors can be reported back to the transmitter device 16, whereby the transmitter device 16 is also operable to receive data and the receiver device 16 is operable to transmit data by a magnetic field generated by the receiver device 16.

Each of said devices 16, 17 and 18 comprises electronic components for receiving, processing and/or outputting signals. Said components are either powered by a battery device or by a power cable, whereby the usage of a battery is favourable for mobile devices. To provide protection for human body against electric shocks, the man-machine interface is well isolated against high-current and high-voltage and/or is operable to use low voltages which are not endangering the user.

Figure 6:
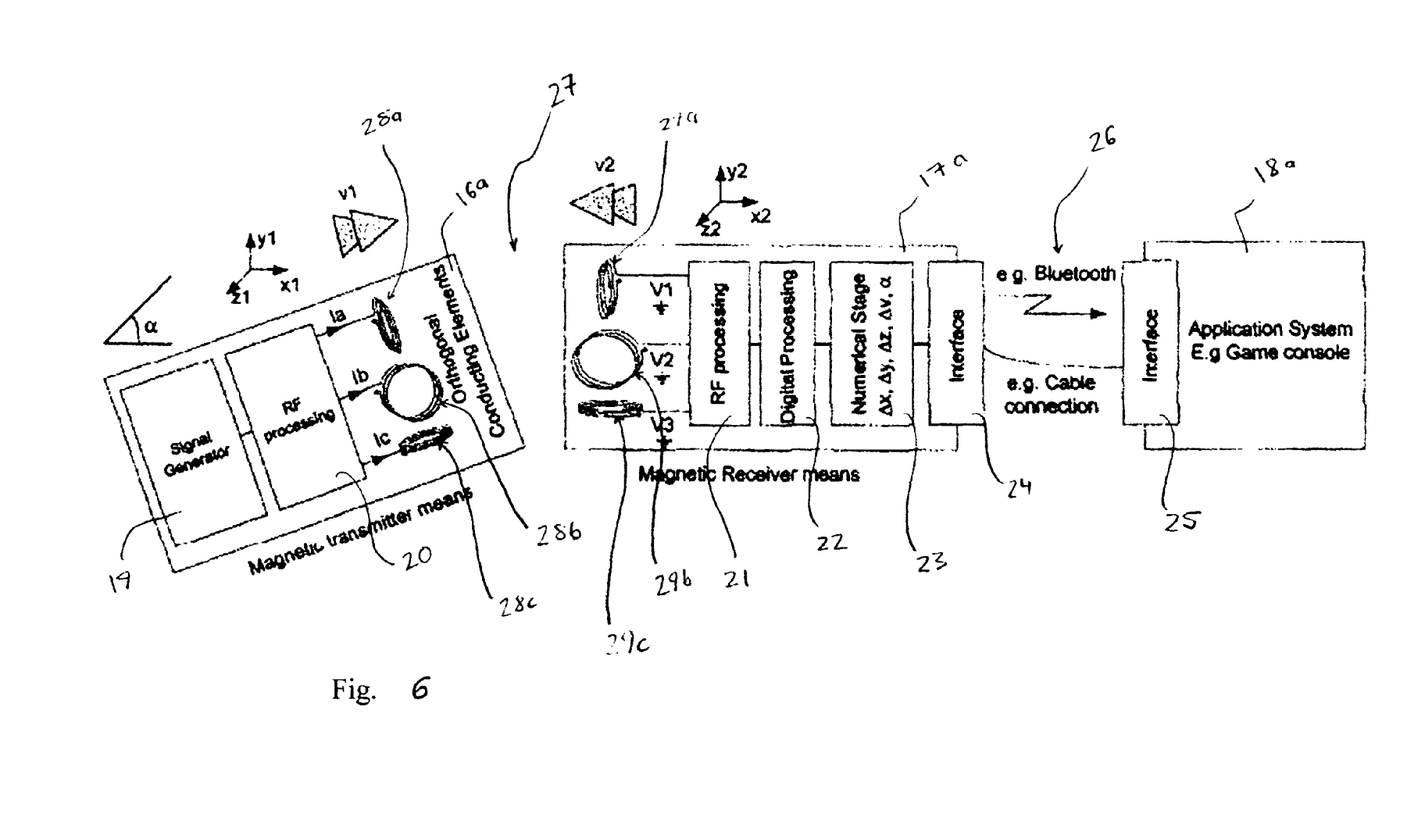
FIG. 6 shows an example of a diagram comprising a second setup of a man-machine interface which is more detailed.

FIG. 6 shows a second example of a diagram of a man-machine interface comprising a generator/transmitter device 16a and a receiver device 17a, said receiver device 17a and eventually said man-machine interface being connected to an application system 18a. The first example of said devices and said system has already been described above and shown in FIG. 5, whereby the generator device 16a corresponds to the generator device 16, the receiver device 17a corresponds to the receiver device 17, and the application system 18a corresponds to the application device 18.

In this setup the position of the generator device 16a is described in a first 3-dimensional coordinate system with the vectors $x_1$, $y_1$ and $z_1$, whereby said vectors are orthogonal to each other. The generator device 16a moves with a specific absolute velocity $v_1$ in said first system. The position of the receiver device 17a is described in a second 3-dimensional coordinate system with the orthogonal vectors $x_2$, $y_2$ and $z_2$ and said device 17a moves with a specific absolute velocity $v_2$ in said second system. Thereby the generator device 16a and the receiver device 17a are arranged to each other in a specific angle α. Of course, the coordinates of the first coordinate system can be converted to the coordinates of the second coordinate system to be able to calculate the relative position, orientation and/or velocity between the two devices 16a and 17a.

Since the two devices 16a and 17a might have different coordinate systems, respectively, their respective reference points might differ from each other and might be provided or transmitted by different external devices (not shown) like e.g. cameras, laser light emitters etc., said external devices being operable to provide a distance and/or position to said device 16a and 17a, respectively. Either the external devices measure said measurement reading like e.g. distance and transmit them to the respective devices 16a and 17a or said devices 16a and 17a determine their respective coordinate system by their own by receiving the raw signals of the external devices like e.g. camera pictures and calculating their position.

Of course, the determination of said two coordinate systems is not required when the generator device 16a and the receiver device 17a utilise the same coordinate system or the coordinate system is already predetermined and stored to the respective generator device 16a and the receiver device 17a due to physical arrangements by e.g. the orthogonal arrangement of the coils. In case said coordinate systems are the same, said coordinate system has a reference position on either one of said devices 16a and 17a or said external device(s) or any other point in a 3-dimensional space.

The generator device 16a comprises a signal generator 19, a transmitter radio frequency (RF) processing 20 and a first, second and third coil 28a, 28b, 28c. The signal generator 19 is connected to the RF processing 20 whereby said signal generator 19 is operable to generate a signal and transmit said signal to the RF processing 20, whereby said signal allows e.g. the receiver device to identify the corresponding and/or respective generator device 16a, whereby said signal is modulated by a specific frequency and/or identification code (ID). The RF processing 20 is connected to the first, second and third coil 28a, 28b, 28c, respectively, and is operable to process a received signal from the RF processing 20 and transmit three transmitter signals based on said received signal to the respective coils. The three coils 28a, 28b, 28c are arranged orthogonal to each other and are operable to receive a current 1a, 1b, 1c, respectively, said currents base on said transmitter signals, and to generate magnetic fields based on said currents, respectively. This magnetic field is eventually providing the connection 27 between the generator device 16a and the receiver device 17a for mutual coupling, whereby the generator device 16a can generate a magnetic field which induces a voltage in the receiver device 17a. The currents 1a, 1b, 1c can also be modulated in the RF processing 20 by a frequency, respectively, said frequency being different to the frequency of the signal sent from the signal generator 19, to help identify the respective signals of the three coils 28a, 28b, 28c and thus the three coils themselves of the receiver device 17a.

The receiver device 17a comprises an interface 24, a numerical stage 23, a digital processing 22, an receiver RF processing 21 and a first, second and third coil 29a, 29b, 29c. The coils 29a, 29b, 29c are arranged orthogonal to each other and are operable to receive the magnetic field generated by the coils 28a, 28b, 28c of the generator device 16a, whereby said magnetic field induces a voltage V1, V2, V3 in said coils 29a, 29b, 29c, respectively. These voltages are received and measured by the receiver RF processing 21 as corresponding voltage signals. The receiver RF processing 21 is operable to receive and process said voltage signals and output a resulting signal based on said voltages V1, V2, V3. The digital processing 22 which is connected to the receiver RF processing 21 is operable to receive said resulting signal, to convert the analogue signal into a digital signal and to output the digital signal to the numerical stage 23. The numerical stage 23 is operable to receive the digital signal, to determine based on said digital signal the relative movement and/or position in the x-, y- and/or z-direction, the velocity, the acceleration and/or the angle α between the receiver device 17a and the generator device 16a. The numerical stage 23 is operable to calculate these information and send them as data to the interface 24. The interface 24 transmits the information via a wireless communication like e.g. Bluetooth or a cable connection like e.g. a USB cable to the interface 25 of the application system 18a. The interface 25 is operable to receive the signal via the receiver device—application system—connection 26 from the interface 24 and transmit it to the application system 18a.

The application system 18a is operable to process said information and is e.g. a game console. After the processing the application system 18a transmits a resulting signal like e.g. a video signal to an output device like e.g. a television or a display, said video signal being based on said information.

In case of a transceiver device later described in FIG. 11, the transceiver device comprises all the features of the transmitter device 16a and the receiver device 17a. In another embodiment the transceiver device might only comprise at least one coil which is shared by the transmitter circuitry and the receiver circuitry, whereby a duplexer is implemented controlling the signals sent from the transmitter circuitry to the at least one coil and the signals received from the at least one coil to the receiver circuitry. This invention is not restricted to a duplexer but could comprise any kind of multiplexer depending on the features of the circuitry.

Figure 7:
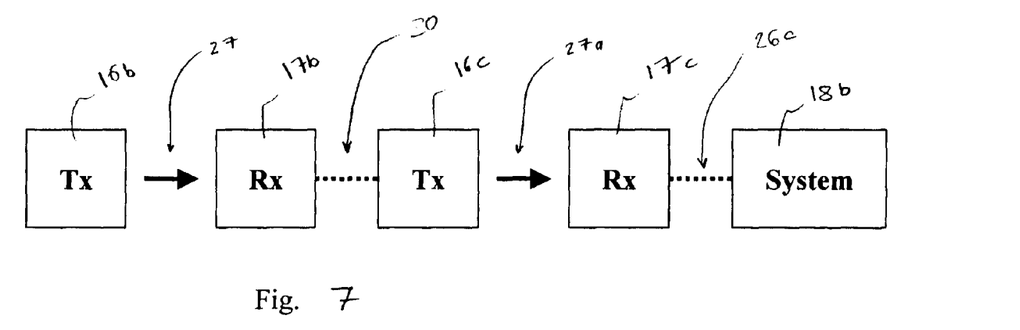
FIG. 7 shows an example of a diagram comprising a third setup of a man-machine interface.

FIG. 7 shows an example of a setup of two man-machine interfaces whereby one interface is connected to a system 18b. The first man-machine interface comprises a transmitting device 16b and a receiver device 17b whereby said receiver is linked by a serial connection 30 with the transmitter device 16c of the second man-machine interface. The second man-machine interface comprises a transmitter device 16c and a receiver device 17c, whereby the receiver device 17c is connected to the system 18b via an application system connection 26c. Eventually this setup shows a serial connection between two man-machine interfaces to a system 18b. The serial connection 30 may comprise a wireless connection like e.g. Bluetooth or a cable connection. Likewise, the connection 26c may also be a Bluetooth or cable connection. The transmitter devices 16b and 16c are connected via a magnetic field 27 and 27a to the receiver means 17b and 17c, respectively. To avoid interferences, the magnetic fields 27 and 27a differ from each other in view of the frequency and/or have different identification codes commonly known in e.g. Code Division Multiple Access (CDMA). Likewise the serial connection 30 and the connection 26c do not interfere with each other. The magnetic field 27a has to transmit also data based on data of the first man-machine interface being transmitted by the serial connection 30. The connection 26c now transmits both data of the first and the second man-machine interfaces.

In another embodiment the serial connection 30 might be formed between the two receiver devices 17b and 17c, whereby the receiver device 17b is operable to transmit the information to the receiver device 17c and the receiver device 17c is operable to receive said data from the receiver device 17b. The serial connection 30 can either be established via the link of the interface of the receiver 17b or via the coil of the receiver 17b also operable to transmit the information. In another embodiment more than two man-machine interfaces are serial connected to each other, forming a chain of man-machine interfaces. In another embodiment, the receiver device 17c is further operable to receive the magnetic field transmitted by the transmitter device 16b, thus operable to calculate the orientation to the transmitter device 16b or receive data transmitted by the transmitter device 16b. Vice-versa, the transmitter device 16c and the receiver device 17b might operate together and calculate their orientation.

Figure 8:
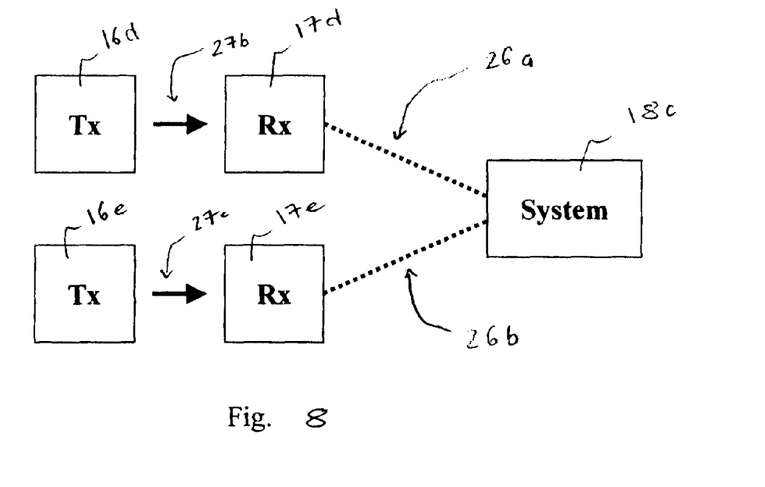
FIG. 8 shows an example of a diagram comprising a fourth setup of a man-machine interface.

FIG. 8 shows an example of a setup of two man-machine interfaces which are parallelly connected to the system 18c. The first man-machine interface comprises a transmitter device 16d and a receiver device 17d, whereby the receiver device 17d is connected to the system 18c by a connection link 26a. The second man-machine interface comprises a transmitter device 16e and a receiver device 17e, whereby the receiver device 17e is connected via the connection link 26b to the system 18c. The magnetic fields 27b and 27c correspond to the magnetic field 27 described in FIG. 5, respectively. Also the first parallel link 26a and the second parallel link 26b correspond to the link 26 described in FIG. 5. It is emphasised, that those parallel links 26a and 26b do not interfere with each other, thus providing a flawless connection of each man-machine interface to the system 18c. The system 18c is operable to identify the respective interfaces and process the received data. Nevertheless it is possible that the receiver device 17e, 17d is operable to receive the magnetic field from the transmitter device 16d, 16e, respectively.

Figure 9:
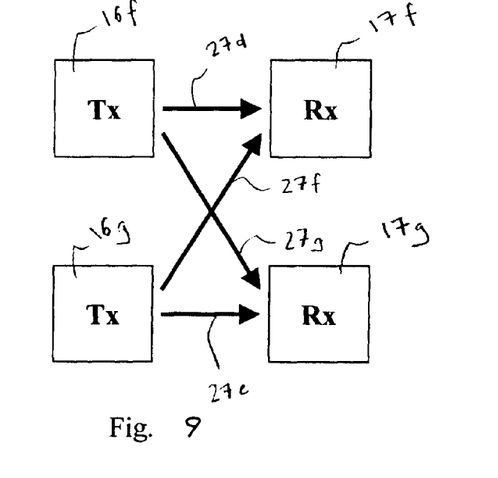
FIG. 9 shows an example of a diagram comprising a fifth setup of a man-machine interface.

FIG. 9 shows an arrangement of two receiver devices 17f and 17g and two transmitter devices 16f and 16g, whereby the transmitter device 16f is operable to send signals which might comprise data modulated onto the signal via a first magnetic field 27d and a second magnetic field 27g to the receiver device 17f and to the receiver device 17g, respectively. The transmitter device 16g is also operable to send a magnetic field 27c to the receiver device 17g and a magnetic field 27f to the receiver device 17f. These magnetic fields 27d and 27g as well as 27f and 27e can be generated simultaneously and can also be received by the respective receiver 17f, 17g simultaneously. The first man-machine interface comprising the receiver 16f and the transmitter 17f and the second man-machine interface comprising the receiver 16g and the transmitter 17g correspond to the man-machine interface comprising the receiver 16 and the transmitter 17 described in FIG. 5, whereby in this case the two man-machine interfaces might receive a magnetic field of the other man-machine interface, respectively.

Thereby, the carrier frequency of the magnetic field 27d might either be similar or equal or different to the frequency of the magnetic field 27g. The features of the magnetic fields 27e and 27f correspond to the one of 27d and 27g, respectively. All in all it is possible that the transmitter devices and receiver devices of different man-machine interfaces interact with each other and set up a connection. According to FIG. 11 in case the interfaces comprise transceiver devices like 40a or 40b these devices can also connect with other transceiver devices of other interfaces.

Figure 10:
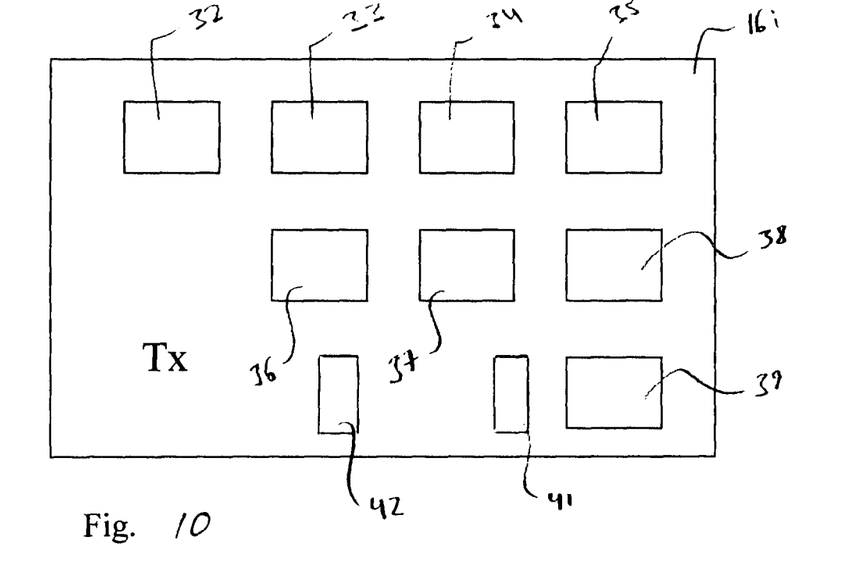
FIG. 10 shows an example of a diagram comprising a generator device.

FIG. 10 shows an example of a generator device 16i which corresponds to one of the above-mentioned transmitter devices. The generator device 16i comprises a temperature measuring system 32, a pressure measuring system 33, a light sensor 34, a capacity measuring system 35, a magnetic field strength measuring system 36, a humidity measuring system 37, a pulse measuring system 38, a radio frequency measuring system 39, an acoustic sensor system 41 and a digital camera system 42.

In other embodiments, different combinations of one or more of said systems are possible and thus part of the generator device 16i. In another embodiment instead of a generator device 16i a receiver device 17 as described in FIG. 5 can be implemented and comprises at least said system 36. The system 36 either comprises at least one coil corresponding to the coil 28a, 28b or 28c shown in FIG. 6 or is an extra system apart from said at least one coil.

The temperature measuring system 32 is operable to measure the temperature of the environment and/or of the human body. The pressure measuring system 33 is operable to sense pressure e.g. by means of piezo elements or by a film similar used like in a touchpad or touch screen. The light sensor 34 is operable to sense and measure the brightness of the environment and/or measure specific emitted laser light by an external emitter device (not shown). The capacity measuring system 35 is operable to measure electric fields and thus the capacity between two surfaces. The magnetic field strength measuring system 36 comprises at least one of those receiver coils described in the afore-mentioned figures. Also hall-sensors might be used instead of or in addition to the coils in said system 36. The humidity measurement system 37 is operable to measure the humidity in the environment and/or on the skin of a human person. The pulse measuring system 38 is operable to measure the pulse of a human person, which either carries the transmitter device 16i or is in contact with said transmitter device 16i; e.g. a person carrying said device 16i might touch another person to measure the pulse. The radio frequency measuring system 39 is operable to receive electromagnetic waves which can differ in frequency. The radio frequency measuring system 39 might comprise e.g. a GPS system. Another possible sensor is an acoustic microphone operable to measure sonic waves and their frequencies. The generator device 16i might also comprise a digital camera to capture visual data. Also passive sensors like e.g. small balls or lamps are implemented for the use of motion capture by an external device. Every data generated by said sensors can be processed and transmitted in real-time or in packages.

In another embodiment, a receiver device has the same structure and/or comprises the same sensors of the transmitter device 16i regarding the plurality of sensors. FIG. 10 eventually shows that a transmitter device or receiver device might possibly comprise several and/or different sensors in addition to the necessary features already described in FIG. 5 or 6.

Figure 11:
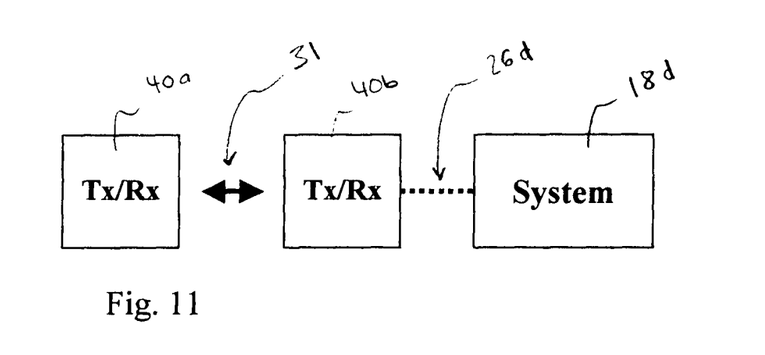
FIG. 11 shows an example of a diagram comprising a sixth setup of a man-machine interface.

FIG. 11 shows an example of a diagram of a man-machine interface comprising a first transceiver device 40a and a second transceiver device 40b, whereby said second device 40b is connected to the system 18d via the link 26d. The two transceiver devices 40a and 40b correspond to the transmitter 16 and the receiver 17 described in FIG. 5 in addition to that the first transceiver device 40a as well as the second transceiver device 40b are operable to both transmit and receive the respective magnetic fields and thus to communicate via a bidirectional link 31. Also the link 26d and the system 18d correspond to the link 26 and the system 18 of FIG. 5, respectively. The first transceiver device 40a can be also operable to connect to the system 18d via a link (not shown) corresponding to the link 26d, in case the second transceiver device 40b looses the connection or to increase the bandwidth and thus the amount of transmitted information/data.

Figure 12:
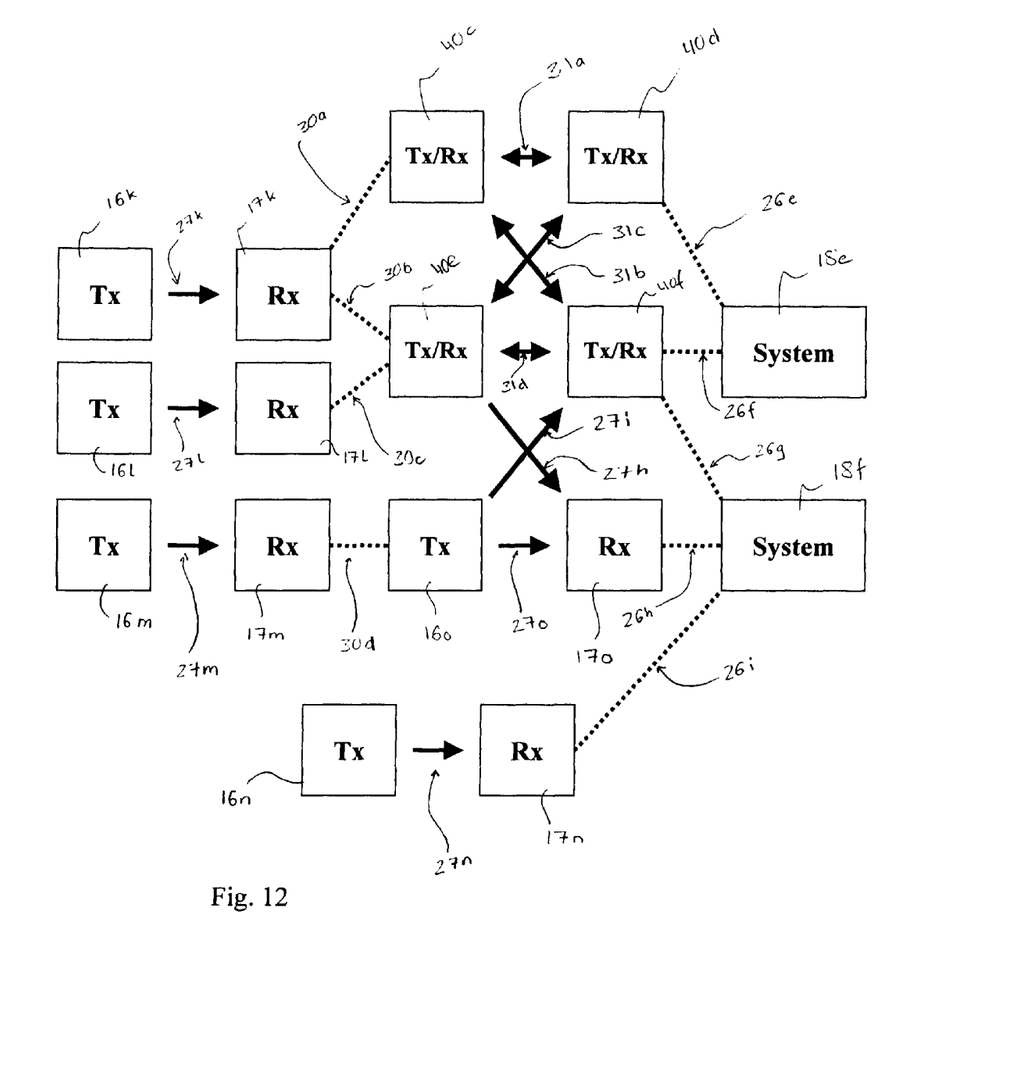
FIG. 12 shows an example of a diagram comprising a network of mobile magnetic field apparatuses and application systems.

FIG. 12 shows an example of a diagram comprising a network of mobile magnetic field apparatuses and application systems. The network comprises five transmitter devices 16k, 16l, 16m, 16n, 16o, five receiver devices 17k, 17l, 17m, 17n, 17o, four transceiver devices 40c, 40d, 40e, 40f and two application systems 18e, 18f. A magnetic field 27k, 27l, 27m, 27n, 27o is established from the transmitter device 16k to 16o to the receiver device 17k to 17o, respectively, favourably transmitting data from the transmitter device 16k to 17o to the respective receiver device 17k to 17o. A magnetic field 31a being established by both transceiver devices 40c and 40d allows a bidirectional connection, thus a magnetic field measurement and an exchange of information between said transceivers 40c and 40d. The magnetic fields 31b, 31c and 31d have the same property between the transceivers 40c and 40f, 40e and 40d, and 40e and 40f, respectively, like the magnetic field 31a.

The connections 30a, 30b, 30c and 30d correspond to the connection 30 described in FIG. 7, respectively, and are operable to connect receiver device 17k with transceiver device 40c, receiver device 17k with transceiver device 40e, receiver device 17l with transceiver device 40e and receiver device 17m with transmitter device 16o, respectively. The connections 26e, 26f, 26g, 26h and 26i correspond to the connection 26 described in FIG. 5, respectively, and are operable to connect transceiver device 40d with system 18e, transceiver device 40f with system 18e, transceiver device 40f with system 18f, receiver device 17o with system 18f and receiver device 17n with system 18f, respectively.

Eventually a mobile magnetic field device as claimed could correspond to any transmitter, receiver or transceiver described in FIG. 12 and could also comprise in addition at least one feature of at least one of said generator devices 16, 16a, 16b, 16c, 16d, 16e, 16f, 16g, 16i, 16k, 16l, 16m, 16n, 16o and/or of at least one of said receiver devices 17, 17a, 17b, 17c, 17d, 17e, 17f, 17g, 17k, 17l, 17m, 17n, 17o and/or of said transceiver devices 40a, 40b, 40c, 40d, 40e, 40f, thus could basically correspond to any of said devices except for or in addition to the technical features required in the specific setups or arrangements described above or shown in the FIGS. 1 to 12, respectively, or being in scope of the invention.

All generator devices, receiver devices and transceiver devices described in the FIGS. 1 to 12 comprise the feature to generate and/or receive a magnetic field by at least on coil. In case of two or more coils, at least two coils of said two or more coils are orthogonal to each or each of said two or more coils has a symmetry axis and the symmetry axis of at least two of said two or more coils are parallel.

There are different possible magnetic field sensors which can be implemented in the receiver or transceiver devices instead or in addition to the receiver coils like e.g. Hall-sensors, Wiegand-Sensors, etc. For the generation of the magnetic field also permanent magnets can be implemented.

The invention was discovered within the work on data transmission systems using magnetic principles in low frequency range below 30 MHz, whereby said invention is not restricted to said frequency range. Although the main purpose of said system is not the distance, position and velocity measurement of two objects, the results of first experimental demonstrations have shown that this information can be extracted from the running system and can be used for various applications, e.g. gaming controllers for gaming consoles.

The magnetic principles can also be used for low data rate communication systems, near field communication systems for short distances and Touchpad applications.

Due to the nature of the magnetic field lines, the mutual coupling between two conducting loops is not attenuated by the human body. This makes the technological principle ideal for an application at or close to the body. The proposal of this invention report is to build a controller as man-machine interface for e.g. game consoles. Transmission and reception conducting means are located in the left respectively in the right hand. By the movement of the hands relatively to each other the distance, orientation and velocity can be derived by the system and is directly interacting with the system scenario.

Also one means, either transmitter of receiver could be at a fixed position, e.g. the console and the receiving means at the human body.

The idea is to use a magnetic communication link to provide relative location information that is possible to use more than one of the state of the art technologies.

In a scenario example, the new magnetic controller is used in conjunction with a gaming console and a car racing game. The magnetic transmitter is in the left hand, the magnetic receiver is in the right hand. Also the right hand system is containing an interface to the application system, a gaming console or PC in this case. The interface can be wireless e.g. Bluetooth or cabled. By bringing the left hand and the right hand together accelerates the car, separating them decelerates it. The velocity of the hand movement is in direct proportion to the acceleration/deceleration speed. Changing the orientation of the hands to each other enable a left turn or right turn movement of the car.

Typical parameters for such a scenario could be
Carrier frequency range less than 30 MHz
Distance<75 cm
Distance resolution 5 mm
Angle resolution 15°

In another scenario a user wears gloves which comprise the controller. In addition to the magnetic transmitters and receivers the controller comprise pressure sensors. When the user now samples a surface like e.g. a face by touching, the surface can be visualised on a display. Of course next to the magnetic transceivers determining the relative position of the right and left glove, the position of the activated pressure elements is known to the electronic of the respective glove.

The magnetic controller system can be extended by a data transmission means from one object to the other by using modulation scheme on the magnetic signal, enabling additional information transfer and scenarios.

A multi-user scenario is feasible using the same frequency due to the fast drop of the magnetic field strength in the vicinity of the transmitter.

Other technologies (e.g. light detection) could be also integrated to the hand controller.

A new controller concept enabling new machine control scenarios is presented. It is not a replacement of existing technologies but a concentration of possibilities by using the nature of the magnetic field.

The main advantage of using the magnetic technology for the controller scenario is the possibility to get information about the relative relation (distance, orientation and velocity) of two or more objects by using only one robust technology that can also be combined with other existing ones.

The technology background is based on the magnetic field. The magnetic field component H of an electromagnetic transmitter dominates the electric field component E in the nearfield of the transmitter. The limit distance between the nearfield and the so called farfield is depending on the frequency of the transmitter and is defined to be $\lambda/2\pi$, where $\lambda$ is the wavelength. In the nearfield the magnetic field strength, measured in dBµA/m, drops along the x-axis of a conductor loop transmitter by $1/d^3$, where d is the axial distance from the centre of the conductor loop. This corresponds to a drop in strength of 60 dB per decade of distance. In the farfield after the separation of the field from the antenna only the free space attenuation of the electromagnetic waves is effective. The field strength is proportional to $1/d$, this corresponds to a loss of 20 dB per decade of distance.

According to Ampere's law a magnetic field is produced by a current that is flowing through a conductor element, in the case of a circular loop with a radius r and N turns the magnetic field strength B in axial direction at a distance d can be calculated to be $$B_z = \mu_0 \frac{INr^2}{2(r^2+d^2)^{3/2}} \approx \mu_0 \frac{INr^2}{2} \frac{1}{d^3} (d^2 \gg r^2)$$

A voltage V is induced into a second conductor loop if this is located in the vicinity of the first conducting loop within the time varying magnetic field B (Faradays law). $\Psi$ is the magnetic flux, S the surface area $$V = -N\frac{d\psi}{dt} = -N\int \vec{B}\cdot d\vec{S}$$

The level of induced voltage is depending on the frequency and strength of the generator current, the distance between the transmitting and the receiving conductor loop, the size and the number of turns of both conducting coils. The quality factor Q is a measure for the selectivity at the frequency of interest.

$V = 2\pi f SNBQ \cos\alpha$

Furthermore there is also an orientation dependency; this means that the induced voltage V is depending on the angle of arrival of the B field lines.

The frequency dependency is compared small when the frequencies are close to each other.

After detection of the level of the induced voltage(s) by a resonance circuit, RF processing with suitable means and further post processing (DAC, Derivation) of the received signal information the relative distance and the relative orientation of two or more objects can be derived. Also the change of the magnetic field strength versus time and distance can be derived and information about the velocity (distance vs. time) and acceleration (velocity vs. time) of the conducting loops can be gathered.

The invention claimed is:

1. A mobile magnetic field apparatus comprising:
   a signal generator device that generates a signal;
   at least one coil that generates a magnetic field; and
   a transmitter radio frequency processing device that receives and processes the signal by modulating the signal by at least one frequency and/or an identification code, and that outputs at least one transmitter signal to the at least one coil, wherein
   the magnetic field is modulated by said at least one frequency and/or identification code,
   the at least one coil transmits data modulated onto the magnetic field, the data including at least one of
   position data of another mobile magnetic field apparatus, orientation data of the another mobile magnetic field apparatus, movement data of the another mobile magnetic field apparatus, measurement data of the mobile magnetic field apparatus, and measurement data of the another mobile magnetic field apparatus, and the mobile magnetic field apparatus is configured to:

wirelessly transmit and wirelessly receive the data to and from the another mobile magnetic field apparatus.

2. The mobile magnetic field apparatus according to claim 1, being configured:

to establish a connection to an application system, the application system processing the data from the mobile magnetic field apparatus, and to transmit and/or receive data to and/or from the application system, via a serial connection.

3. The mobile magnetic field apparatus according to claim 2, wherein the serial connection is a wireless connection and/or a cable connection.

4. The mobile magnetic field apparatus according to claim 1, being configured:

to generate and/or receive at least a second magnetic field, the at least second magnetic field being distinguishable from the magnetic field and other magnetic fields in view of the modulation.

5. The mobile magnetic field apparatus according to claim 1, further comprising:

a temperature measuring system that measures temperature; and/or a pressure measuring system that measures pressure; and/or a capacity measuring system that measures electric fields; and/or a magnetic field strength measuring system that measures magnetic field strength; and/or a humidity measurement system that measures humidity; and/or a pulse measuring system that measures pulse of a subject; and/or a radio frequency measuring system that receives electromagnetic waves; and/or an acoustic sensor system that measures sonic waves; and/or a digital camera system that captures visual data, wherein the systems provide the measurement data of the mobile magnetic field apparatus, respectively.

6. The mobile magnetic field apparatus according to claim 5, further comprising a light sensor that measures characteristics of light.

7. The mobile magnetic field apparatus according to claim 1, comprising two or more coils, wherein at least two coils of said two or more coils are orthogonal to each other.

8. The mobile magnetic field apparatus according to claim 1, comprising two or more coils, wherein each of the two or more coils has a symmetry axis and the symmetry axis of at least two of the two or more coils are parallel.

9. The mobile magnetic field apparatus according to claim 1, wherein said at least one transmitter signals includes transmitter signals which are different to each other in view of the modulation.

10. A mobile magnetic field controller system operable to measure a relative position, orientation and/or velocity comprising:

a first mobile magnetic field apparatus according to claim 1; and a second mobile magnetic field apparatus, as the another mobile magnetic field apparatus comprising:

at least one second coil that receives a second magnetic field, the second magnetic field being modulated by at least one frequency and/or identification code, wherein the at least one second coil receives data via the second modulated magnetic field;

a receiver radio frequency processing device that receives and processes signals received by the at least one second coil, and that outputs a resulting signal; and a digital processing device that receives and processes the resulting signal and that outputs a digital signal based on said resulting signal.

11. The mobile magnetic field controller system according to claim 10, further comprising:

a duplexer that transmits the at least one transmitter signal from the transmitter radio frequency processing device to the at least one coil and that receives the resulting signal from the at least one coil to the receiver radio frequency processing device.

12. The mobile magnetic field controller system according to claim 10, wherein the first mobile magnetic field apparatus receives a magnetic field transmitted by the second mobile magnetic field apparatus, and vice-versa.

13. The mobile magnetic field controller system according to claim 10, wherein the first and said second mobile magnetic field apparatus receives and transmits data transmitted to and received by the another other mobile magnetic field apparatus.

14. The mobile magnetic field controller system according to claim 10, wherein the magnetic field controller system also connects to an application system via an interface of the magnetic field apparatus.

15. The mobile magnetic field controller system according to claim 10, wherein the magnetic field controller system connects in parallel to an application system, when another magnetic field controller system is connected to the application system.

16. The mobile magnetic field controller system according to claim 10, that further connects to at least one other magnetic field controller system via a serial connection, respectively.

17. The mobile magnetic field apparatus according to claim 1, wherein the data includes at least one of:

the position data of the another mobile magnetic field apparatus, the orientation data of the another mobile magnetic field apparatus, and the movement data of the another mobile magnetic field apparatus, and the data includes at least one of:

the measurement data of the mobile magnetic field apparatus, and the measurement data of the another mobile magnetic field apparatus.

18. The mobile magnetic field apparatus according to claim 1, wherein the data includes:

the position data of the another mobile magnetic field apparatus, the orientation data of the another mobile magnetic field apparatus, the movement data of the another mobile magnetic field apparatus, and the measurement data of the mobile magnetic field apparatus.

19. The mobile magnetic field apparatus according to claim 1, wherein the data includes:
    the position data of the another mobile magnetic field apparatus,
    the orientation data of the another mobile magnetic field apparatus,
    the movement data of the another mobile magnetic field apparatus, and
    the measurement data of the another mobile magnetic field apparatus.

20. The mobile magnetic field apparatus according to claim 1, wherein the mobile magnetic field apparatus and the another mobile magnetic field apparatus have different coordinate systems.

21. A mobile magnetic field apparatus comprising:
    at least one coil that receives a magnetic field, the magnetic field being modulated by at least one frequency and/or identification code, wherein the at least one coil receives data via the modulated magnetic field;
    a receiver radio frequency processing device that receives and processes signals received by at least one coil, and that outputs a resulting signal; and
    a digital processing device that receives and processes the resulting signal and that outputs a digital signal based on said resulting signal,
    wherein the data includes at least one of
        position data of another mobile magnetic field apparatus,
        orientation data of the another mobile magnetic field apparatus,
        movement data of the another mobile magnetic field apparatus, and
        measurement data of the another mobile magnetic field apparatus, and
    the mobile magnetic field apparatus is configured to:
    wirelessly transmit and wirelessly receive the data to and from the another mobile magnetic field apparatus.

22. The mobile magnetic field apparatus according to claim 21, the apparatus configured to receive a magnetic field, and further comprising:
    a numerical stage that receives and processes a digital signal and that outputs data comprising relative positions, movements and/or orientations; and
    an interface that receives the data and output said data.

23. The mobile magnetic field apparatus according to claim 21, being configured:
    to establish a connection to an application system, the application system processing data from the mobile magnetic field apparatus, and
    to transmit and/or receive data to and/or from the application system, via a serial connection.

24. The mobile magnetic field apparatus according to claim 23, wherein the serial connection is a wireless connection and/or a cable connection.

25. The mobile magnetic field apparatus according to claim 21, being configured to generate and/or receive at least a second magnetic field, the at least second magnetic field being distinguishable from the magnetic field and other magnetic fields in view of the modulation.

26. The mobile magnetic field apparatus according to claim 21, comprising two or more coils, wherein at least two coils of said two or more coils are orthogonal to each other.

27. The mobile magnetic field apparatus according to claim 21, comprising two or more coils, wherein each of the two or more coils has a symmetry axis and the symmetry axis of at least two of the two or more coils are parallel.

* * * * *